(12) United States Patent
Williams

(10) Patent No.: US 11,977,997 B1
(45) Date of Patent: May 7, 2024

(54) TAGGING SYSTEMS AND METHODS FOR EFFICIENT CLOUD SERVICE PROVISIONING

(71) Applicant: CloudSaver, Inc., Overland Park, KS (US)

(72) Inventor: Mark Williams, Overland Park, KS (US)

(73) Assignee: CloudSaver, Inc., Overland Park, KS (US)

( * ) Notice: Subject to any disclaimer, the term of this patent is extended or adjusted under 35 U.S.C. 154(b) by 0 days.

(21) Appl. No.: 17/976,202

(22) Filed: Oct. 28, 2022

(51) Int. Cl.
*G06F 15/173* (2006.01)
*G06Q 10/0631* (2023.01)
*H04L 47/76* (2022.01)

(52) U.S. Cl.
CPC ....... *G06Q 10/06315* (2013.01); *H04L 47/76* (2013.01)

(58) Field of Classification Search
CPC ...................................................... H04L 47/76
See application file for complete search history.

(56) References Cited

U.S. PATENT DOCUMENTS

| | | | |
|---|---|---|---|
| 9,626,609 B1 * | 4/2017 | Ferguson | H04W 76/10 |
| 9,767,409 B1 * | 9/2017 | Makhijani | G06F 16/7867 |
| 9,934,269 B1 * | 4/2018 | Kahrs | G06F 9/5061 |
| 2017/0163507 A1 * | 6/2017 | Pai | H04L 41/5051 |
| 2019/0207945 A1 * | 7/2019 | Yuan | H04L 63/101 |
| 2020/0322442 A1 * | 10/2020 | Luo | H04L 41/0672 |
| 2021/0297322 A1 * | 9/2021 | Yu | H04L 41/0886 |

\* cited by examiner

*Primary Examiner* — Padma Mundur
(74) *Attorney, Agent, or Firm* — Erise IP, P.A.

(57) ABSTRACT

Embodiments of the current disclosure provide systems and methods for tagging data for efficient deployment of cloud services to a company. In some embodiments, cloud service data may be obtained by a system. The cloud service data may be tagged by the system in a standard tagging system and organized according to tag categories. The tagged data may then be analyzed to determine resource provisioning by the cloud service provider and compared to consumption by the company utilizing the cloud services to find services that are not used or not used efficiently. New policies may be generated and uploaded to the cloud service provider to optimize resource allocation based on the analysis results.

20 Claims, 4 Drawing Sheets

TAGGING SYSTEMS AND METHODS FOR EFFICIENT CLOUD SERVICE PROVISIONING

BACKGROUND

1. Field

Embodiments of the disclosure generally relate to tagging systems and methods. More specifically, embodiments of the disclosure relate to tagging cloud-based data objects for efficient cloud service provisioning.

2. Related Art

Cloud services are currently offered for personal and business applications. These services may provide dynamic cloud-based computing services to the users. Though the cloud service providers provide dashboard analytics and cost per service reports, they are typically provided in a such a general sense that it is difficult to understand and difficult to find inefficiencies and unnecessary cloud instances. Therefore, visibility to costly cloud services is limited. Companies can typically only see and analyze a limited set of the cloud services that are provided. Each individual user and the services provided may be hidden behind the generalized global analytics model and total cost reporting with a limited itemized breakdown. Furthermore, larger companies may require so many cloud resources that it is simply not economical to reduce the analytics down to a fine granularity to determine the need for (or needed size of) individual instances. Accordingly, it is unknown how many services are not used or not used efficiently. As such, there is a need for cloud service transparency such that the cloud data can be tagged and organized in a manner that enables the optimization of provisioned services.

Furthermore, typically, it is difficult or confusing for users to tag data associated with the provisioned services from the cloud service. Without proper tagging of cloud services, it may be difficult for users to readily determine important elements of provisioned services, including identifying who is responsible for maintaining the resource, identifying which application is running on the resource, and identifying how to allocate the cost associated with the resource. Furthermore, a user who originally provisioned a cloud service may leave the company without transitioning important deployment details about their cloud environment. Without proper tagging of the cloud services any resources and services utilized by the user may remain provisioned, with no knowledge of the need for or original purpose of the deployed service. This leads to extensive waste and inefficiency.

A further problem is that, even when a user or an administrator adds tags to cloud services and resources, many updates to the tags may be required over time to maintain the tags and accommodate for changes such as employee turnover, changes to the application versions, and changes to cost allocation methodologies. Generally, tag maintenance is performed manually by a user via the cloud service provider's console or by writing a custom script to process a batch of tag changes via the cloud service provider's command line interface. There is no standard for automated batch tagging. This is very time consuming for the user and extremely inefficient.

SUMMARY

Embodiments of the invention solve the above-mentioned problems by providing systems and methods of tagging data indicative of cloud-based service provisioning to organize data and generate policies for efficient cloud service provisioning. Furthermore, the updated tagging may be performed in a secure virtual environment for generating and testing the updates outside of the cloud service providers. The systems and methods described herein provide are unique and improved systems that optimize allocation and provisioning of cloud service resources.

A first embodiment is directed to a method of tagging data for efficient deployment of cloud services to a company. The method comprises obtaining, from a cloud service provider, tagged data and untagged data indicative of the cloud services, retagging the tagged data to generate retagged data in a standard tagging system, tagging the untagged data to generate new tagged data using the standard tagging system, analyzing the retagged data and the new tagged data to determine resource allocation by the cloud service provider, comparing the resource allocation to consumption by the company, and updating the resource allocation to optimize the cloud services.

A second embodiment is directed to one or more non-transitory computer-readable media storing computer-executable instructions that, when executed by at least one processor, perform a method of tagging data for efficient deployment of cloud services to a company. The method comprises obtaining, from a cloud service provider, tagged data and untagged data indicative of the cloud services, retagging the tagged data based to generate retagged data in a standard tagging system, tagging the untagged data to generate new tagged data using the standard tagging system, analyzing the retagged data and the new tagged data to determine resource allocation by the cloud service provider, comparing the resource allocation to consumption by the company, generating new policies to reduce the resource allocation based on the comparing, and uploading the new policies to the cloud service provider.

A third embodiment is directed to a system of tagging data for efficient deployment of cloud services to a company. The system comprises at least one processor, a data store, and one or more non-transitory computer-readable media storing computer-executable instructions that, when executed by the at least one processor, perform a method of tagging the data for the efficient deployment of the cloud services to the company. The method comprises obtaining, from a cloud service provider, tagged data and untagged data indicative of the cloud services, retagging the tagged data to generate retagged data in a standard tagging system, tagging the untagged data to generate new tagged data using the standard tagging system, analyzing the retagged data and the new tagged data to determine resource allocation by the cloud service provider, comparing the resource allocation to consumption by the company, and updating the resource allocation to optimize the cloud services.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein.

Figure 1:
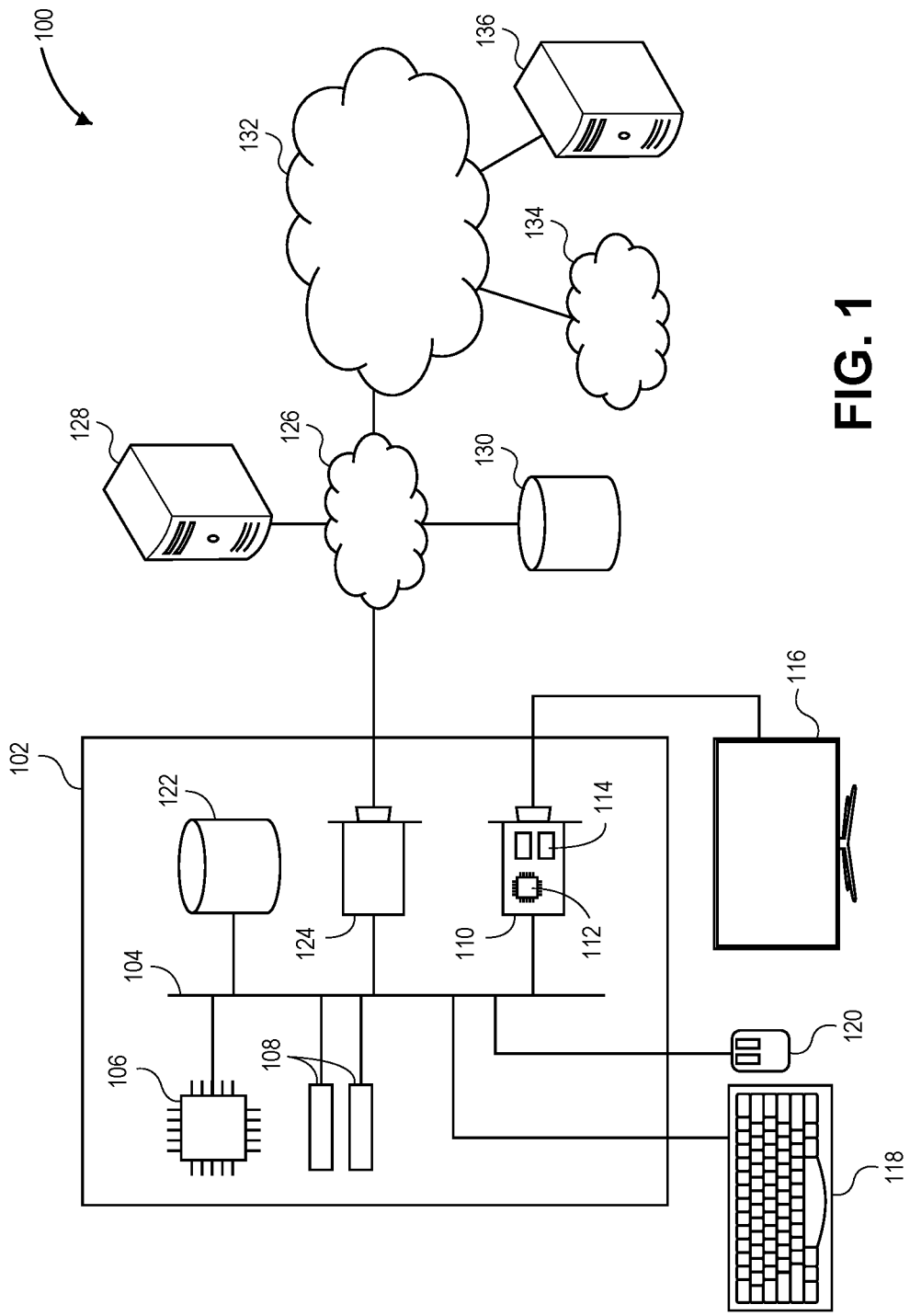
FIG. 1 depicts an embodiment of a hardware system for implementing embodiments described herein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Generally, embodiments of the disclosure are directed to utilizing data tagging for efficient cleanup, organization, and analysis of cloud-based data objects. The cloud-based data objects may be associated with any cloud service provider (CSP) such as, for example, Amazon Web Service (AWS), Microsoft Azure, Google Cloud Platform, ServerSpace, and any others. In some embodiments, the systems described herein, may communicatively connect with any CSP and provide systems and methods for automated and/or manual tagging of data objects associated with the CSP.

In some embodiments, data tags and analytics may be provided by the CSP and utilized by the system to optimize resource allocations. Furthermore, data that is not tagged, or untagged data, may be tagged and further analytics may be performed beyond that provided by the CSP. As such, more in-depth control of the analytics may be given to the company for mining data associations representative of wasted resources.

In some embodiments, the data mining and tagging may be performed in a secure virtual environment running outside of the CSP. As such, a full or partial virtual CSP environment may be test prior to uploading new provisioning policies to the CSP.

Turning first to FIG. 1, an exemplary hardware platform that can form one element of certain embodiments of the invention is depicted. Computer 102 can be a desktop computer, a laptop computer, a server computer, a cloud-based virtual server, a mobile device such as a smartphone or tablet, or any other form factor of general- or special-purpose computing device. Depicted with computer 102 are several components, for illustrative purposes. In some embodiments, certain components may be arranged differently, absent, or virtualized. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
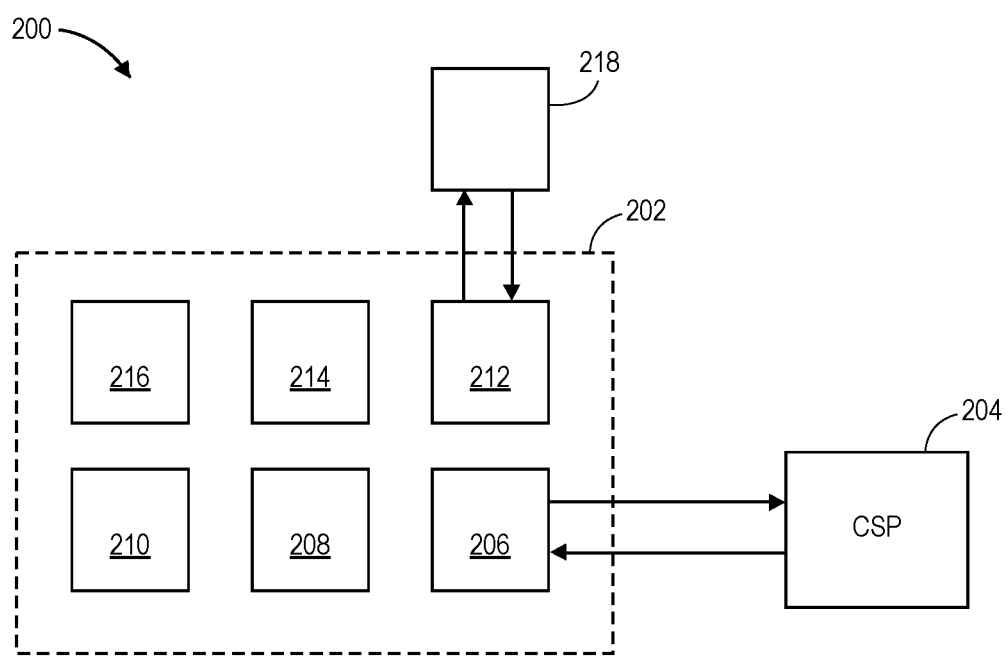
FIG. 2 depicts an exemplary system for providing embodiments described herein.

In some embodiments, system 100 may be provided to a third-party user or company as described in embodiments herein. The company may be any company of any size from a single individual to a large company employing thousands or millions of personnel. The company may utilize at least one CSP 204 (as depicted in FIG. 2) to supply its cloud software and hardware needs. A user, in embodiments herein, may be any person associated with the company including an employee, a company administrator, an information technology (IT) administrator, a third-party consultant or contractor, or the like. In some embodiments, the user may be a person associated with provisioning resources from CSP 204 or a person interfacing with system to provide analytics and optimization of resource provisioning from CSP 204.

Generally, optimization herein describes using an optimization algorithm to substantially maximize or minimize a variable or set of variables based on parameters and constraints. Here, optimization may be performed to more efficiently allocate resources of CSP 204 to the company described herein. This reduces wasted processing and costs and provides more efficient cloud services.

In some embodiments, the user may tag data from CSP 204 or virtual data indicative of the provided services. Tags may comprise a key-value pair. The key may provide a first indicator and the value may provide a second indicator that may be a value for the first indicator. Accordingly, the tags may be used to call data from specific categories of a user, company, or CSP 204 resource or service. For example, to determine costs for a specific department, the key may be department and the value may be shipping. Therefore, any warehouse management cloud services data may be pulled for analysis. The tagging system may be used to pull data from any department (e.g., marketing, receiving, IT, engineering, etc.) that uses cloud services for software as a service (SaaS), infrastructure as a service (IaaS), platform as a service (PaaS), and/or any other cloud service. Furthermore, in some embodiments, any untagged data obtained from CSP 204 may be tagged to generate data structures for efficient query and analysis. The tagging processes, data cleanup and organization are described in more detail below.

FIG. 2 depicts exemplary network 200 comprising system 202 that includes non-transitory computer-readable media storing computer-executable instructions that, when executed by one or more processors, performs the methods described in embodiments disclosed herein. In some embodiments, system 202 may be implemented by a company for optimizing deployments used for cloud services provided by CSP 204. In some embodiments, system 202 may comprise various operations for completing these tasks such as, for example, CSP interface 206, cleanup and organization manager 208, tag manager 210, interface 212, virtual environment provider 214, compliance and policy manager 216, and any other software systems that may be necessary to complete the methods as described herein. In some embodiments, the various systems may work together simultaneously and may not be viewed as independent systems. The independent labeling of the systems is exemplary and for explanation only. System 202 and methods performed thereby should be viewed as an inclusive system. Furthermore, computing device 218 may be any computer for a user to employ any of the manual tagging, analytics, and updating methods described herein.

In some embodiments, system 202 may be computer 102 and may be connected to CSP 204 by Internet 132. CSP 204 may be any standard CSP 204 such as AMAZON WEB SERVICE (AWS), AZURE, GOOGLE Cloud Services, Terraform Cloud, and the like. Furthermore, CSP 204 may provide any standard SaaS, IaaS, PaaS, or any other cloud service. In embodiments described herein, CSP 204 may be a single CSP or a plurality of CSPs. The data may be indicative of any resources including any processes, procedures, policies, software, and hardware associated with providing cloud services to the company. Furthermore, some data objects may be tagged or may be associated with tags that may be called to provide a clear picture of the processes, procedures, software, and hardware provided by CSP 204. In some embodiments, data obtained from CSP 204 may not include tags.

In some embodiments, system 202 may be system 100 and may connect to CSP 204 by Internet 132. The communication between system 202 and CSP 204 may be managed by CSP interface 206 comprising hardware and/or software for communication between system 202 and CSP 204. In some embodiments, access to various resources, services, analytics, data, tags, associated meta data, and any other features of CSP 204 may be obtained by system 202 through the association of the company with CSP 204. Furthermore, rather than simply having permissions to access data and analytics of CSP 204, permissions may be obtained from CSP 204 in a batch permission process to obtain access to all accounts. As such, all data associating accounts with all resources and services may be accessed. Though the data may be accessed, the visibility may still be limited as CSP 204 may not tag all data associated with resources and services. Therefore, system 202 may access and organize tagged and untagged data.

In some embodiments, many accounts are accessible and many policies for managing these accounts are open to modification based on the association between the company, system 202, and CSP 204. The services provided by CSP 204 to the company may include many SaaS, PaaS, and IaaS resources and services as well as many accounts for providing the resources and service. Accordingly, to analyze all resources and services as well as locations, times, and histories of provisioning, it may be necessary to access all accounts and associated data. This may be performed through a batch permissions process. The batch permissions process may provide permissions to each account associated with each user and each resource such that system 202 may query all available data on CSP 204 regardless of CSP 204 tagging. Furthermore, in some embodiments, data may be imported into system 202. Any data in the history of servicing the company may be accessible by system 202.

In some embodiments, system 202 may access CSP 204 data associated with the cloud dashboard and reporting for obtaining information related to analytics and cost. The analytics and cost data may provide a basic insight into the resources and services provisioned for the company and the costs associated with the resources and services. Generally, any tagged data and analytics from CSP 204 reporting and dashboards may be visible and imported by system 202.

In some embodiments, the cost and analysis data provided by CSP 204 may be compared to data associated with actual company consumption of the services. For example, an application may be provided to the company for a user that no longer works at the company. The company may be charged for the resource provisioning to provide the application though the user is no longer using the application. In some embodiments, this may be obvious and system 202 may simply compare the user/department/company data with the CSP-provided analytics and cost data and determine discrepancies. System 202 then may automatically resolve the issue by uploading new provisioning policies for the user and/or resource and service allocation. The new provisioning policies may be stored at system 202 and may be provided based on the results of the analysis of the resource provisioning and the consumption of the company. However, in some embodiments, only information related to departments may be known and department managers may be notified to sift through the data and find the issues. This can be a time-consuming task that it resolved by system 202, as described herein.

In some embodiments, CSP 204 may not provide all information that the company desires to form a complete analysis of their cloud services. Accordingly, system 202 may data mine the CSP data to find discrepancies in resource provisioning and company consumption. This may be possible by the account access provided by CSP interface 206 described above. This provides a fine-grain analysis of the data and history of resource provisioning that is not provided by the dashboard, reporting, and analytics of CSP 204.

In some embodiments, any data associated with users and resources and services may be obtained. The data may include any tagged data, untagged data, analytics data, dashboard data, reporting data, as well as any historical interactions between users and resources and services, metadata associated with data objects (tagged and untagged), users and other users, first users and second users, a plurality of users, and any other stored data. In some embodiments, the data also includes automatic interactions and stored data based on provisioning policies. Accordingly, any data that may be associated with any resources and services may be accessed by system 202.

In some embodiments, cleanup and organization manager 208 and tag manager 210 may process the tagged and untagged data to generate efficient associations between the data and query tables. In some embodiments, data associated with CSP 204 may not conform to a single standard. For example, CSP 204 may be a plurality of CSP with various tagging techniques. Alternatively, CSP 204 may be a single CSP, but the tagging of various resources may have been performed by a plurality of users not using consistent tagging methods. As such, the data tags may need to be "cleaned" or modified to conform to a standard technique. For example, in some cases a tag may be "application" and in others the tag may be "Application" or "app." Therefore, when system 202 is attempting to organize data associated with a particular application, a plurality of syntaxes may need to be input to capture all instances of the application. This could be very time consuming for a user to draft code to capture all instances. Therefore, a statistical or machine learning algorithm may be used to determine probabilities that tags should be divided into buckets. For example, a convolution neural network may be used to scan data tags and determine the probability that "app" represents the same resource as "application." If the probability is above a threshold value, then "app" and "application" may be retagged to a tagging standard such as, for example, "Application." As such, all previously tagged data can be retagged to a set tagging standard automatically by system 202. In the event that a tag is below the threshold, or between decision thresholds, a user may be notified for decision.

In some embodiments, the data may be organized for efficient access and tagging. The data may be organized into categories related to tagged and untagged, departments, data type, users, resources, times, and the like. The data may be organized into tables based on associations for quick retrieval. For example, data may be tabulated based on resources and/or user. In some embodiments, users may desire to look up a history of provisioning a particular application in a particular department. Therefore, data associated with the provisioning of a particular application may be tabulated for quick retrieval. Furthermore, in some embodiments, query tables may be generated associating and indexing the location of each table. Therefore, when a user queries the particular application a series of query tables may be accessed providing the location of the stored data associated with the application for efficient access.

In some embodiments, the tags may be utilized to find services and weed out policies that are causing inefficiencies in the company network caused by provisioning resources from CSP 204 that are not used by the company or are not used by the company efficiently. The tagged data and the associated data objects may be analyzed for consumption. The consumption may quantify use of the services as time-based, instance-size-based, resource-based, power-based, or any other quantity indicative of company consumption of the resources provided by CSP 204. As such, system 202 may determine services that are being provisioned but not used or inefficiently used. The provisioned services may be automatically updated, cancelled, or the user or an administrator may be notified of the services and the inefficient use. The user may then decide whether to cancel or roll back the services.

In some embodiments, system 202 may look up users and find associated services. For example, a user may leave the company after provisioning the cloud services. System 202 may find all services associated with the user and provide a batch update to the policies provisioning resources for the user. The updated policies may be generated compliant with CSP 204 by compliance and policy manager 216. The updated policies may then be provided to CSP 204 by CSP interface 206. When the policies related to the user are updated, system 202 may automatically move to another user for a similar analysis. In some embodiments, the communication, tagging, analysis, and updating is continuous (real-time or near real-time) such that the policies are always up to date with only a small delay for processing. Continuous processing for automated updates is described in more detail below.

In some embodiments, system 202 may look up services and find associated users. For example, analysis of the tagged data may find high cost for a particular provisioned application. A more detailed analysis may comprise searching a history of the application and associated data including user identifiers to find that the application was installed by a user that is no longer with the company, yet the resources providing the application are still allocated to the company each day. This results in inefficient allocation of resources causing waste. System 202 may then utilize compliance and policy manager 216 to generate updated policies for CSP 204. The updated policies may then be provided to CSP 204 by CSP interface 206. In some embodiments, the communication, tagging, analysis, and updating is continuous such that the policies are always up to date with only a small delay for processing. Continuous processing for automated updates is described in more detail below.

In some embodiments, a history of services and/or users may be searched for indications of wasted resources. There may be years of data that may be searched to find a user/resource association to determine how a resource was installed. Furthermore, predetermined policies may determine next steps when user/resource associations are determined. For example, the user may automatically be contacted requesting information associated with the resource and recent use. The communication may be text, email, phone call, or any other communication method and may be provided automatically by system 202.

Alternatively, as described above, the user may no longer be with the company, and it may not be possible to contact the user associated with the service. Accordingly, an automated set of rules may be accessed to determine next steps. For example, if the user is no longer at the company, the resource provisioning may automatically be cancelled. In some embodiments, the user's supervisor, another person in the department, a company administrator, and/or an IT administrator may be contacted and informed of the resource provisioning to a user that is no longer associated with the company.

Figure 3:
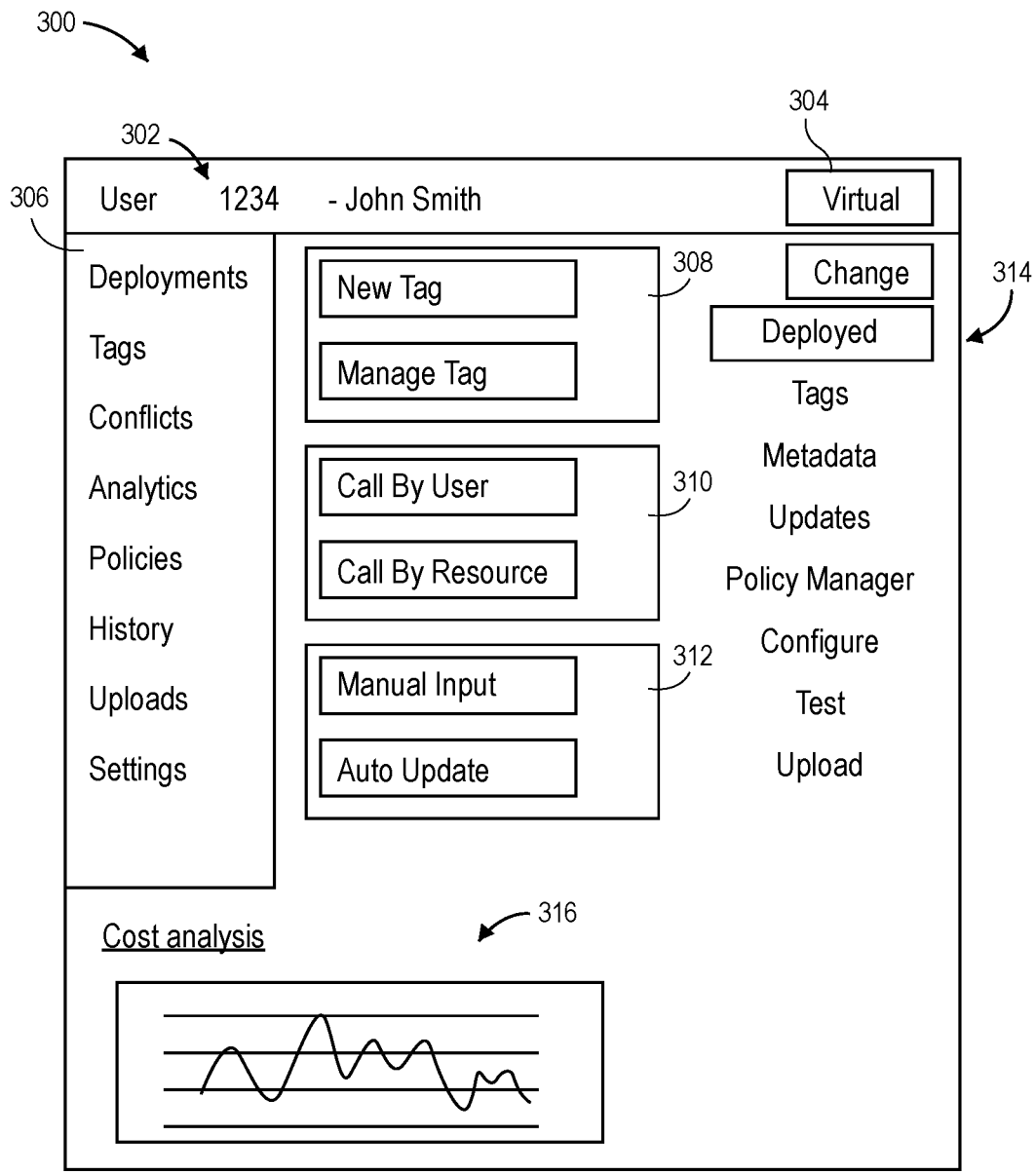
FIG. 3 depicts an exemplary user interface caused for display by the system in some embodiments.

FIG. 3 depicts an exemplary user interface 300 caused for display by system 202 for a user to interface with system 202. Generally, any user, company employee, system administrator, consultant, contractor, or any other person may be interface with system 202 to manage or facilitate data download from CSP 204, contacted to resolve the issue. All of the above-described automatic features may be performed by a user interfacing with user interface 300. Exemplary user 302 here is John Smith with associated user id 1234. Status indicator 304 may display if the user is working in the standard CSP-associated environment as described above, or if the user is working in a virtual environment. Here, John Smith is working in the virtual environment. Generally, any automatic or manual features and methods described herein may be performed in the virtual environment. The virtual environment is described in more detail below.

At main menu 306 John may access various tabs for viewing and managing deployments, tags, conflicts, analytics, policies, history, uploads, and settings. Any of the above-described actions of system 202 related to the topics of main menu 306 may be performed by the user manually by accessing these tabs. Furthermore, new tags may be added to new services and existing tags may be edited by accessing tags menu 308. The user may add new tags when installing a new application or service or signing up for a new application or service. As such, any resources necessary to provide the services may be associated with the user. Furthermore, any existing tags may be modified by the user to allocate different resources or to change the user associations.

In some embodiments, data may be tagged in batches. For example, timing of provisioning a resource may be associated with a policy or a resource but may not necessarily be tagged. Typically, this would require a separate set of instructions for tagging. However, using batch tagging in the standard or virtual environment (described below), a single set of instructions may automatically tag any data object associated with a particular resource and/or user. Therefore, any data that is not tagged in CSP 204 may be tagged automatically.

Data associated with users, resources, times, or any other services may be tagged by the user or automatically as described above. Accordingly, the tags may be used to identify users, resources, and policies that may be modified to reduce unnecessary waste. Furthermore, these modifications may be performed in batches. The user may access tags menu 308 to write computer-executable instructions to for batch tagging. The batch tagging may be performed based on associations. For example, the user may no longer be employed by the company. The resources associated with the user may be tagged for modification. These tags may be used to cancel resources that are no longer used based on the user no longer working at the company. Alternatively, the user may be a first user and a second user may replace the first user. The tags may update the resources to be associated with the second user. Accordingly, the policies may be updated to provision the resources based on the second user. As described above, the batch tagging may be performed automatically and the computer-executable instructions to automatically perform the batch tagging may be drafted by the user at tags menu 308.

As described above, data may be called automatically by user or resource by system 202. At call tab 310, the user may manually provide tags for calling and filtering data by user or by resource. Similarly, at input tab 312, the user may input any tags for calling any data described herein. The user may also initiate automatic update to return to continuously automatic updates. Furthermore, at menu 314, various features may be provided for modifying tags, the virtual environment, or any the features described herein.

In some embodiments, system 202 may cause for display user interface 300 for the user to view analytics, tag data objects, or the like. User interface 300 may provide notifications to the user when tagging issues and/or efficiencies are found as described in embodiments herein. User interface 300 may provide buttons, drop down menus, search fields, and the like for receiving input from the user.

As shown at status indicator 304, the user is working in the virtual environment provided by virtual environment provider 214. Any of the above-described automated and manual features may be performed in the virtual environment. In some embodiments, system 202 may generate the virtual environment for tagging, updating policies, and testing policy updates outside of CSP 204. Any of the tagging and analysis description provided about may be performed in the virtual environment. For example, certain resources in particular CSPs may not be natively taggable, and virtual tagging allows such objects to support tags. In some embodiments, the data objects and tags provided by CSP 204 may be imported or recognized by system 202 and virtual data objects representative of the data objects and virtual tags indicative of the tags may be generated. In some embodiments, these virtual data objects may be indicative of CSP 204 data such that analytics may be performed and simulations of CSP 204 resource provisioning may be virtually simulated to optimize virtual resource and provisioning usage indicative of the actual services provided by CSP 204. Furthermore, any updated policies for services and resource usage may be simulated in the virtual environment. In some embodiments, the virtual environment may be indicative of CSP 204 such that analytics may be performed on the information obtained from CSP 204 may be completely indicative of CSP 204. Accordingly, analytics may be performed, and modified policies may be tested to optimize resources and provisioning in the virtual environment prior to making concrete changes to CSP 204.

Furthermore, any data indicative of resource provisioning that is not tagged in CSP 204 may be tagged in the virtual environment using a virtual tagging system. First, the untagged data may be tagged meeting the standard tagging requirements as described above. Furthermore, when the tagged data is transferred to the virtual environment, it may be virtually tagged for security or to run in the virtual environment. In some embodiments, data uploaded to the virtual environment may be provided by an application program interface (API). The API may provide a secure mapping of data to the virtual environment such that the virtual environment requires special permission to access. Therefore, the virtual environment may provide a secure location for simulating the CSP 204 services.

In some embodiments, various levels of access may be provided by system 202 to the company. System 202 may connect to a single CSP 204 or a plurality of CSP 204 simultaneously for providing analysis across the plurality of CSP 204. Analytics dashboards and reporting documents may be accessed for analysis as described above. The tagged and untagged data may be analyzed and retagged according to a standard tagging system. The updated tagged data may be restructure and tabulated for efficient lookup. Furthermore, the updated tagged data may be referenced in various reference tables to provide quick query and lookup. Any tags may be viewed by resource, user, key, value, or any other associated data. All data processing and analysis may be performed on a one-time, scheduled, or continuous basis. All data processing and analysis may be performed in the virtual environment providing a secure environment that may simulate CSP services prior to uploading updated policies. Any features described herein may be provided in any combination.

In some embodiments, analytics tab 316 may provide any analytics from any stage of the process. The analytics may display tag and tagged data analytics and statistics, resource usage, application usage, and/or optimization analytics comparing previous efficiency and costs with new efficiency and costs associated with new policies. Any analytics may be displayed to the user for quick and simple understanding and comparison of the data.

Figure 4:
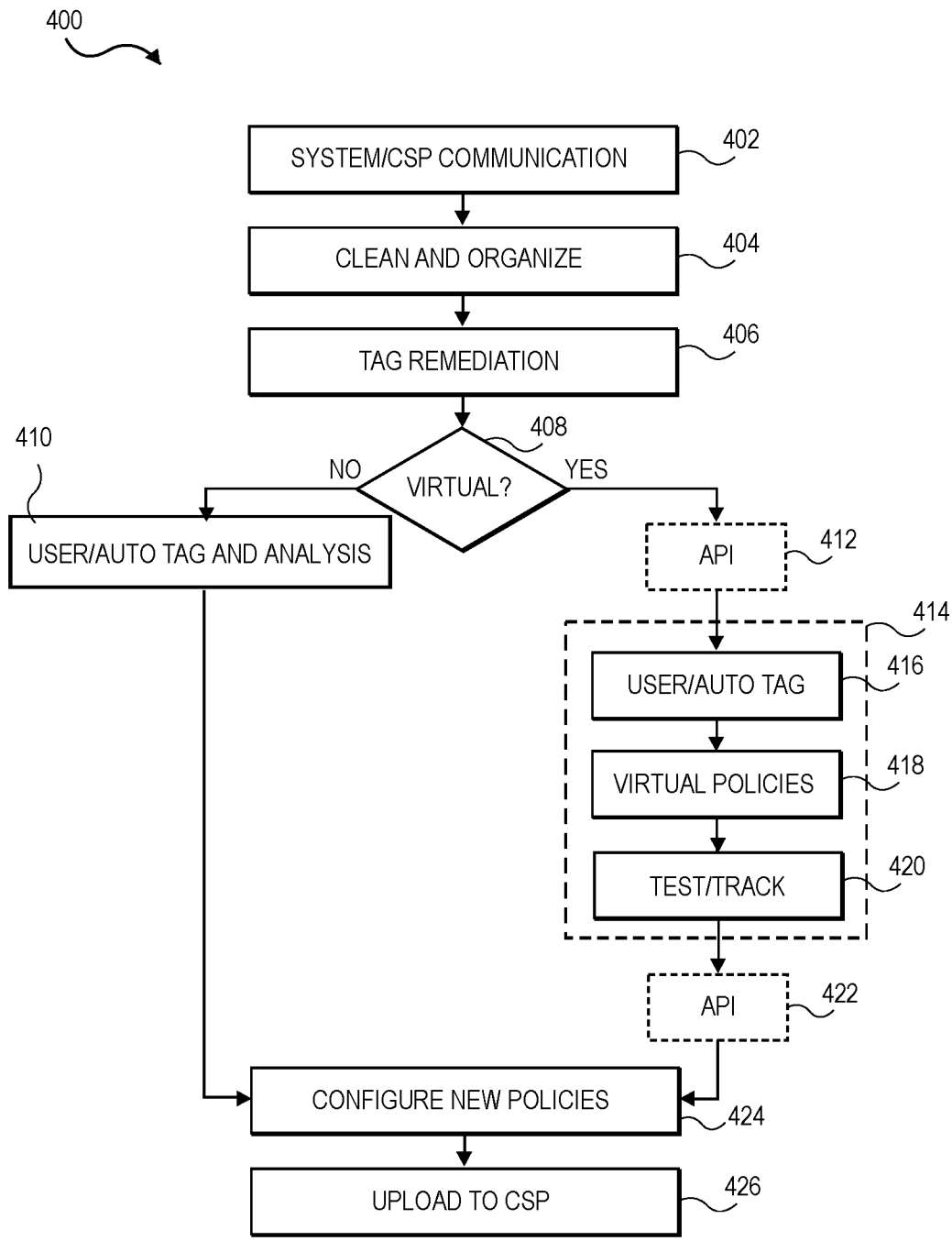
FIG. 4 depicts an exemplary flow chart representing embodiments of the methods described herein.

FIG. 4 depicts a flow chart outlining an exemplary method 400 of optimizing services from CSP 204. At step 402, system 202 may communicate with CSP 204 to obtain data for analysis of the provided services. The data may be indicative of the services provided by CSP 204 to the various user, departments, and locations of the company. In some embodiments, the data may include tagged and untagged data as well as dashboard and reporting data. Any data and tags associated with any service provided by CSP 204 may be obtained.

At step 404, the data tags may be cleaned and organized by system 202. The data tags obtained from CSP 204 may not be standardized and therefore may have variances that results in data tags that should be associated to not be associated. Therefore, the variances are standardized be the cleanup and organization manager 208 and the tag manager 210. As described in embodiments above, the tags may be analyzed by automated algorithms to determine similarities and if the tags fall within groups such as, for example, departments, users, resources, applications, and the like. The data may be retagged based on the determined associations. Furthermore, untagged data may be tagged based on similar analysis with the automated algorithms determining probabilities of association between data objects obtained from CSP 204.

Furthermore, at step 404, once all data is tagged, the data may be organized based on the tags. The data may be organized into similar groups such as, department, user, resource, policy, or the like. Similarly, indicators may be indexed for quick query and access.

At step 406, a round of tag remediation may be performed. Tags that are not associated with other tags may be sent to a user to verify the information or manually retag the data. Furthermore, when analytics show high costs, tags associated with the high costs may be reviewed to a finer granularity. For example, an application may have 20% higher usage than any other application. The usage for that application may be reviewed down to each user rather than by department. This fine-granularity analysis may reveal users that do not use the application. Therefore, the resources provisioning the application for these users may be de-provisioned. In some embodiments, this round of tag remediation may be general based on explicit signs of issues or may be optional.

At step 408, the user or system 202 may decide if the data is input into the virtual environment. The virtual environment may provide a higher security level and may provide an environment for simulating CSP services such various services may be tested. Furthermore, the virtual environment may provide tagging features not supported natively by CSP 204. It may be decided by a user to import data into the virtual environment or may be decided by the system based on policies. For example, simple continuous maintenance and optimization of services may bypass the virtual environment to stay up to date without delays; however, if a major issue is found in analytics, or if a major update is being made, the policy may dictate simulation in the virtual environment. Examples of a major update may be batch tagging, reviewing and updating policies based on user tags, reviewing and updating policies based on resource tags, or updating a plurality of policies.

At step 410, when the data is not moved to virtual environment (or is also uploaded to the virtual environment), and the data may go through a process of retagging and another, or a first, round of tag remediation and analysis. The tag remediation and analysis may be performed as is described at step 406. Furthermore, analysis on the data tags and the comparison of consumption to resource provisioning may be determined. For example, as described above, it may be determined that resources are being allocated to a user that is no longer with the company. The results of the analysis may be output to the compliance and policy manager 216 to generate new policies at step 422.

In some embodiments, virtual simulations may be performed for some or all policies updating while the updating at step 410, the new policy configurations at step 422, and uploading new policies to CSP 204 at step 424 continue. In this way, the service allocation remains optimized as simulations for major updates continue. When the data is uploaded to the virtual environment, the data may be provided by an API. The API may map the data to virtual data indicative of the services in the virtual environment and the security features may be added to require permissions to view and edit the virtual data. In some embodiments, the tagged data and untagged data of CSP 204 obtained at step 402 may be directly input into the virtual environment 414 through API 412 and step 404 and step 406 may be performed in the virtual environment as step 416. In any case, step 416 may be performed similarly to steps 404 and 416 at a finer granularity as described above.

At step 418, new virtual allocations and policies may be generated based on the output of step 416 described above. The new virtual policies may be generated to modify the tagging and/or resource allocation of CSP 204 in the virtual environment. Furthermore, at step 420, as CSP provides services, the data may be input into the virtual environment to test the new virtual policies to ensure that the cost, efficiency, or the like is optimized based on desired optimization algorithm used. When it is determined that the new virtual policies optimize the services provided by CSP 204, the new virtual policies may be mapped through the API as step 422 and provided to step 424 when new policies are configured for CSP 204. Here, new policies may be either generated or reconfigured to be loaded into CSP 204. At step 426, the new policies are loaded into CSP 204 to run the new optimized services.

In some embodiments, the methods provided above may be performed continuously and the time to complete may only be limited by processing time, such that updates are performed in real-time or near-real-time. In some embodiments, the time to move from step 402 to step 426 may only take fractions of a second. As such, the optimization of the services may only be delayed by processing times. In some embodiments, the virtual environment may run simultaneously as the non-virtual optimization. Therefore, as the virtual environment tests larger policy changes, the optimization of the CSP 204 services may still be performed.

Although the invention has been described with reference to the embodiments illustrated in the attached drawing figures, it is noted that equivalents may be employed, and substitutions made herein without departing from the scope of the invention.

Having thus described various embodiments, what is claimed as new and desired to be protected by Letters Patent includes the following:

The invention claimed is:

1. A method of tagging data for efficient deployment of cloud services to a company, the method comprising:
   obtaining, from a cloud service provider, tagged data objects and untagged data objects associated with resources of the cloud services provided by the cloud service provider,
   wherein the tagged data objects are a first set of data objects tagged by the cloud service provider and untagged data are a second set of data objects not tagged by the cloud service provider;
   retagging the tagged data objects to generate retagged data objects comprising a standardized format for tracking allocation and use of the resources;
   tagging the untagged data objects to generate new tagged data objects comprising the standardized format for tracking the allocation of the resources;
   tracking the retagged data objects and the new tagged data objects to track resource allocation and the use of the resources by the company;
   inputting the untagged data objects and the tagged data objects into a simulated environment through an application program interface (API);
   tagging the untagged data objects and the tagged data objects with virtual tags to create virtual data objects, wherein the virtual tags are not valid in the cloud service provider;
   performing a simulation of the resource allocation and the use by the company to determine consumption using the virtual data objects in the simulated environment;
   generating new policies that reduce the consumption in the simulated environment based on the simulation; and
   uploading the new policies to the cloud service provider.

2. The method of claim 1, wherein the tagged data objects and the new tagged data objects comprise a key-value pair.

3. The method of claim 1, further comprising causing display of the tagged data objects, the untagged data objects, the resource allocation, and the consumption to an administrator associated with the company.

4. The method of claim 1, wherein the virtual tags are only valid in the simulated environment and access to the simulated environment is limited by security features added by the API.

5. The method of claim 1, further comprising optimizing, by the new policies, the resource allocation to reduce the consumption by the company associated with a specific user that is no longer with the company.

6. The method of claim 1, further comprising:
   determining a probability that a plurality of tags of the tagged data objects matches a category of tags and updating syntax of the tags,
   wherein the untagged data objects and the tagged data objects are retagged with the virtual tags automatically when the tags of the untagged data objects and the retagged data objects match the syntax.

7. The method of claim 1, further comprising:
   organizing the retagged data objects and the new tagged data objects by categories,
   wherein the categories are at least user or resource.

8. One or more non-transitory computer-readable media storing computer-executable instructions that, when executed by at least one processor, perform a method of tagging data for efficient deployment of cloud services to a company, the method comprising:
   obtaining, from a cloud service provider, tagged data objects and untagged data objects associated with resources of the cloud services provided by the cloud service provider,
   wherein the tagged data objects are a first set of data objects tagged by the cloud service provider and untagged data are a second set of data objects not tagged by the cloud service provider;
   retagging the tagged data objects to generate retagged data objects comprising a standardized format for tracking allocation and use of the resources;
   tagging the untagged data objects to generate new tagged data objects comprising the standardized format for tracking the allocation and the use of the resources;
   tracking the retagged data objects and the new tagged data objects to determine resource allocation and the use of the resources by the company;
   determining consumption by the company by the resource allocation and the use of the resources;
   generating new policies reallocating the resources to reduce the consumption;
   importing the new tagged data objects and the retagged data objects into a simulated environment;
   simulating the resource allocation and the use of the resources in the simulated environment using the new policies, the new tagged data objects, and the retagged data objects to determine a new consumption; and
   uploading the new policies to the cloud service provider.

9. The media of claim 8, wherein the method further comprises:
   filtering the retagged data objects and the new tagged data objects based on a user identity to find user resources, wherein the user resources are associated with the user identity; and
   generating the new policies to optimize the resource allocation based on the user resources.

10. The media of claim 8, wherein the method further comprises:
    filtering the retagged data objects and the new tagged data objects based on a resource of the resources;

determining users associated with the resource; and
generating the new policies to optimize the resource allocation based on the users associated with the resource.

11. The media of claim 8, wherein the method further comprises:
organizing the retagged data objects and the new tagged data objects according to categories; and
generating indices for querying the retagged data objects and the new tagged data objects.

12. The media of claim 8, wherein the method further comprises generating the new policies to optimize the resource allocation based on a table listing users in the company.

13. A system of tagging data for efficient deployment of cloud services to a company, the system comprising:
at least one processor;
a data store; and
one or more non-transitory computer-readable media storing computer-executable instructions that, when executed by the at least one processor, perform a method of tagging the data for the efficient deployment of the cloud services to the company, the method comprising:
obtaining, from a cloud service provider, tagged data objects and untagged data objects associated with resources the cloud services provided by the cloud service provider,
wherein the tagged data objects are a first set of data objects tagged by the cloud service provider and untagged data are a second set of data objects not tagged by the cloud service provider;
retagging the tagged data objects to generate retagged data objects comprising a standardized format for tracking allocation and use of the resources;
tagging the untagged data objects to generate new tagged data objects comprising the standardized format for tracking the allocation and the use of the resources;
importing the new tagged data objects and the retagged data objects into a simulated environment and retagging the new tagged data objects and the retagged data objects with virtual tags to create virtual data objects;
simulating resource allocation and the use of the resources in the simulated environment using the virtual data objects to generate new policies that reduce consumption by the company; and
uploading the new policies to the cloud service provider to reduce the consumption by the company.

14. The system of claim 13, the method further comprising:
generating filtered data by filtering the retagged data objects and the new tagged data objects based on either a user or a resource of the cloud service provider; and
determining the resource allocation based on the filtered data.

15. The system of claim 13, wherein the method further comprises:
determining a probability that a plurality of tags of the tagged data objects match a category of tags and updating syntax of the tags to match a cloud service provider syntax,
wherein the untagged data objects and the tagged data objects are retagged automatically when the tags of the untagged data objects and the retagged data objects match the syntax.

16. The method of claim 1, further comprising:
generating analytics associated with the resource allocation and the consumption of the company; and
causing display of a user interface displaying the analytics to an authorized user associated with the company.

17. The media of claim 8, wherein the method further comprises:
generating analytics associated with the resource allocation and the consumption of the company; and
causing display of a user interface displaying the analytics to an authorized user associated with the company.

18. The system of claim 13, wherein the method further comprises:
generating analytics associated with the resource allocation and the consumption of the company; and
causing display of a user interface displaying the analytics to an authorized user associated with the company.

19. The system of claim 13, wherein the method further comprises:
generating a table comprising a list of users that are no longer with the company; and
updating the new policies to stop allocating the resources to users on the list of users.

20. The system of claim 13, wherein the method further comprises:
generating filtered data by filtering the retagged data objects and the new tagged data objects based on a resource of the resources to find users associated with the resource; and
generating the new policies to optimize the resource allocation based on the filtered data.

* * * * *